United States Patent Office 3,582,486
Patented June 1, 1971

---

3,582,486
PHOTOCHEMICAL REACTION OF FUCHSONES AND PHENOLS TO PRODUCE BISPHENOLS
Hans-Dieter Becker, Schenectady, N.Y., assignor to General Electric Company
No Drawing. Original application Sept. 13, 1966, Ser. No. 578,987. Divided and this application Feb. 3, 1970, Ser. No. 8,425
Int. Cl. B01j *1/10*
U.S. Cl. 204—158       8 Claims

ABSTRACT OF THE DISCLOSURE

A photochemical process is disclosed for making certain hydroxyl derivatives of tetraphenyl methane by irradiating a solution of certain 2,6-disubstituted phenols and certain fuchsones with ultraviolet light in the presence of certain benzophenones or acetophenones as a photosensitizer. The products are useful antioxidants and intermediates for making polyester and polycarbonate resins.

---

This invention is a division of my copending application, Ser. No. 578,987, filed Sept. 13, 1966 and assigned to the same assignee as the present invention.

This invention relates to a photochemical reaction for producing certain novel bisphenols. More particularly, this invention relates to a process for producing certain bisphenols which have four phenyl groups attached to a central aliphatic carbon atom, at least two of the phenyl groups having hydroxyl groups in the para position relative to the attachment to the central aliphatic carbon atom, but three or four of the phenyl groups may be so substituted.

In my copending application Ser. No. 579,008, now U.S. Pat. 3,541,116, filed Sept. 13, 1966, and assigned to the same assignee as the present invention, I have disclosed and claimed a photochemical reaction whereby certain 2,6-disubstituted phenols are reacted with benzophenones to produce certain novel fuchsones. The method used involves irradiation of a solution of these phenols and benzophenones in acid-free acetone solution with light having a wavelength in the range of 300–500 m$\mu$, but not substantially below 300 m$\mu$ to produce a triphenyl carbinol which, when acidified in methanol solution, is converted to the corresponding fuchsone.

I have now discovered that fuchsones will further react with phenols in the presence of a photosensitizer, in a solution acidified with mineral acid when irradiated, in the substantial absence of oxygen, with light having a wavelength in the range of 300–500 m$\mu$, but not substantially below 300m$\mu$ to produce the bishpenols of this invention. The fuchsones which can be used are those fuchsones having the formula shown below wherein the numbers shown in the formula indicate the ring positions of the substituents used in this specification for naming the fuchsones:

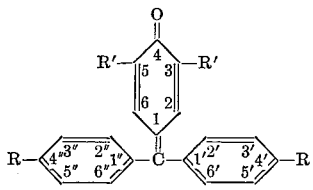

where each R is independently selected from the group consisting of hydrogen, hydroxyl, halogen, alkyl, aryl alkoxycarbonyl, acyloxy, and hydrocarbonoxy, and each R' is independently selected from the group consisting of aryl, alkyl and alkoxy.

These fuchsones are sometimes named as substituted $\alpha,\alpha$-diphenyl-1,4-benzoquinone methides or as substituted 2,5-cyclohexadiene-1-ones. However, in this application, because it simplifies the naming of these materials, they will be named as substituted fuchsones.

In addition to hydrogen, hydroxyl and halogen, i.e., fluorine, chlorine, bromine, iodine, specifically named above, R may be alkyl, aryl, alkoxycarbonyl, i.e.,

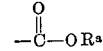

where $R^a$ is alkyl, including cycloalkyl and aralkyl; acyloxy, i.e.,

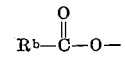

where $R^b$ is alkyl, including cycloalkyl and aralkyl, or aryl, including alkaryl; and hydrocarbonoxy, i.e.,

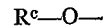

where $R^c$ is an aliphatic hydrocarbon (i.e., alkyl, akenyl and alkynyl) including cycloaliphatic and aryl substituted aliphatic hydrocarbon, or aromatic hydrocarbon, including aliphatic substituted aromatic hydrocarbon. Preferably R, when it is other than hydrogen, hydroxyl or halogen, and R' have from 1 to 8 carbon atoms but may have as many as 30 or more carbon atoms.

Typical examples of alkoxycarbonyl which R may be, are: methoxycarbonyl, ethoxycarbonyl, propoxycarbonyl, butoxycarbonyl, hexoxycarbonyl, cyclohexoxycarbonyl, octoxycarbonyl, triacontoxycarbonyl, etc. Typical examples of acyloxy which R may be are: acetoxy, phenylacetoxy, propionoyloxy, butanoyloxy, octanoyloxy, triacontonoyloxy, benzoyloxy, methylbenzoyloxy, toluoyloxy, naphthoyloxy, ethylbenzoyloxy, etc. Typical examples of hydrocarbonoxy which R may be are: alkoxy, which R' also may be, e.g., methoxy, ethoxy, propoxy, butoxy, hexoxy, cyclohexoxy, phenoxy, toloxy, xyloxy, phenylethoxy, benzoxy, methylbenzoxy, etc., and, in addition, alkenoxy and alkynoxy, for example, vinoxy, alloxy, crotoxy, propargyloxy, (2-propynoxy) etc. Typical examples of aryl which R and R' may be, are phenyl, tolyl, xylyl, naphthyl, methylnaphthyl, ethylphenyl, propylphenyl, diethylphenyl, etc. Examples of alkyl which R and R' may be are the primary, secondary and tertiary alkyl groups, e.g., methyl, ethyl, propyl, isopropyl, butyl, sec-butyl, t-butyl, the various amyl isomers, the various hexyl isomers, up to those alkyl groups having as many as 30 or more carbon atoms, e.g., triacontyl, and including the cycloaliphatic and aryl substituted aliphatic, e.g., cyclohexyl, methylcyclohexyl, ethylcyclohexyl, benzyl, naphthylmethyl, phenylethyl, methylbenzyl, ethylbenzyl, phenylpropyl, etc.

These fuchsones are reacted with a 2,6-disubstituted phenol in which the substituents in the 2 and 6 position are each independently selected from the group consisting of aryl, secondary alkyl and tertiary alkyl, Typical examples of which have been given above with respect R and R' of the fuchsones. These phenols have the formula:

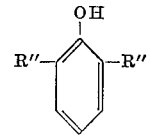

where R" is aryl, secondary alkyl or tertiary alkyl.

The reaction between the phenol and the fuchsone is a photochemical reaction which is carried out in the substantial absence of oxygen, and applied heat, using light having a wavelength in the range of 300–500 m$\mu$, but not substantially below 300 m$\mu$.

This reaction requires use of a photosensitizer for the reaction and the presence of a mineral acid, e.g., hydrochloric acid, sulfuric acid, nitric acid, etc. preferably hydrochloric acid. The photosensitizers which I have found satisfactory for this reaction are those benzophenones having the formula:

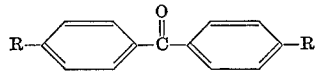

and those acetophenones having the formula:

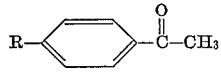

where each R in the formula for the benzophenone and the acetophenone are the same as defined above with regards to the formula for the fuchsones.

The bisphenols prepared by this method have the following formula where the numbers designate the positions used in naming the compounds of this invention:

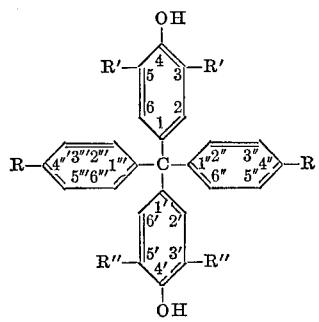

where each R and R' is the same as described above for the fuchsone and each R" is the same as described above for the phenol. It will be recognized that the upper three phenyl rings and the central carbon atom are derived from the fuchsone and the lower phenyl ring is derived from the phenol used to make the bisphenol.

The reaction is carried out using a solvent which is a liquid capable of dissolving the photosensitizer and it must be capable of at least partially dissolving the phenol and fuchsone reactants. Furthermore, it must not absorb in the region of the wavelengths of light used and must be inert to both the reactants and the final product. Preferably it is a non-solvent for these phenols produced, so that they precipitate from the reaction or are low boiling and can be readily evaporated, thereby simplifying the isolation of the final product since it can be readily filtered from the reaction mixture or the solvent can be readily distilled. Solvents which I have found convenient to use for this reaction are the lower-alkyl alcohols, e.g., methanol, ethanol, isopropanol, propanol, the various isomeric butanols, acetone, acetonitrile, the lower-alkyl carboxylic acids, e.g., acetic acid, propionic acid, butyric acid, etc. Of these solvents, methanol is to be preferred since it leads to the highest yield of the bisphenol products and suppresses side reactions.

Since the reaction is a photochemical reaction, thereby depending on the absorption of the light used for irradiation, the efficiency of the reaction is governed by the amount of light absorbed. Since the light is initially absorbed by the photosensitizer, the amount of photosensitizer used will determine the efficiency of the reaction. I prefer to use the photosensitizer in amounts from 5 to 10 times the amount of the phenol used on a molar basis. The amount of mineral acid needed to catalyze this reaction needs to be only a very small amount, in the order of 0.1 to 0.2 ml. of acid per 100 ml. of solvent.

In order to suppress side reactions, the wavelengths of the radiation should be such that light is absorbed by the photosensitizer, but not by either the product, the initial phenol or the solvent. To meet these criteria, the wavelengths of the light should be in the range of 300–500 m$\mu$, but not substantially below 300 m$\mu$. Because some of the materials in the reaction mixture will absorb in the region below 300 m$\mu$, the wavelengths of light should be above this region. The light may also include wavelengths greater than 500 m$\mu$, but preferably the greatest proportion of the wavelengths is in the cited range. Since the fuchsones will absorb in the region of the wavelengths used, solvents should be used in which the fuchsones are only slightly soluble, so that at any one time, only small amounts are present in solution, but as it is used in the reaction with the phenol more dissolves. The solvents listed above are relatively poor solvents for most of the fuchsones although the presence of the acid does tend to increase the solubility.

A convenient source of light to be used for irradiating this solution is obtained by using an ultraviolet light and attaching it to a filter, for example, Pyrex glass, which will filter out all the wavelengths of light below 300 m$\mu$. Alternatively radiation from any appropriate source may be used keeping in mind that the actual range of wavelengths used should include the wavelengths which are absorbed by the particular photosensitizer. The radiation source is preferably chosen to produce the greatest amount possible of the wavelengths which are absorbed by the photosensitizer, but not by the other components of the reaction mixture. This is because only the light absorbed by the photosensitizer is utilized in promoting the reaction. When using any of the benzophenones or acetophenones included in the above general formula for these materials, ultraviolet light from a mercury vapor quartz lamp filtered through Pyrex glass is very satisfactory for the reaction.

Progress of the reaction between the phenol and the fuchsone is easily monitored because the amount of fuchsone which does dissolve in the solution produces a yellow color. When all of the fuchsone has reacted, the reaction mixture loses the color due to the dissolved fuchsone and is completely colorless or only very slightly yellow. An alternative method is to monitor the reaction mixture by withdrawing a small sample and analyzing by gas chromotography until the concentration of the phenol becomes constant. The irradiation may be continued for 24 hours with no adverse effect, although in general the reaction is completed in about 4 hours, in the equipment used in the examples. The total time, of course is dependent on the actual quantity of light absorbed since one quantum of light must be absorbed for each molecule of the fuchsone reacted. For highest utilization of the radiation, it should be completely absorbed by the photosensitizer.

When the phenol, which is reacted with the fuchsone, is a 2,6-di-t-tertiary-alkyl substituted phenol and the fuchsone is a 3,5-di-tertiary-alkyl substituted fuchsone in which the substituents are the same as the phenol, it is not essential to start with fuchsone itself. As I have disclosed in my U.S. Patent 3,541,116 when a 2,6-di-t-alkylphenol, e.g., 2,6-di-t-butylphenol is photochemically reacted with a benzophenone having the formula given above for the benzophenone photosensitizer, in the presence of methanol containing a mineral acid, the phenol and the benzophenone first produce a fuchsone. The fuchsone so produced then reacts with more of the phenol to produce the bisphenol. This alternative procedure can be used to prepare those bisphenols having the above formula in which the same 2,6-di-t-alkylphenol is the source of the upper and lower phenyl rings (those having the R' and R" substituents) and the benzophenone is the source of the two other phenyl rings (those having the R substituents). For example, it is possible to prepare a reaction mixture containing the 2,6-di-t-butylphenol and the desired benzophenone in a solvent acidified with a mineral acid. During irradiation, the 2,6-di-t-butylphenol first reacts with the benzophenone to form the fuchsone which then reacts with additional 2,6-di-t-butylphenol to produce the bisphenol without having to isolate the intermediate fuchsone product. In carrying out this reaction, the same solvents mentioned above for the reaction between the fuchsone and the phenol may be used, but again methanol is the preferred solvent.

The phenols which can be used in this latter method are limited to 2,6-di-t-alkyl substituted phenols and it is especially useful when the phenol is 2,6-di-t-butylphenol. It will be recognized that the benzophenone used as a reactant in the first part of the reaction should be used in such a quantity that there will be sufficient present to also act as a photosensitizer in the later reaction between the fuchsone and the phenol.

In both of the above reactions, the reaction is run without application of external heat, e.g., at ambient or below ambient temperature, but not sufficient to freeze the reaction mixture.

It is obvious from what has been said above that both of the above reactions can be carried out simultaneously in the same reaction vessel. When a fuchsone is reacted with a 2,6-di-t-alkylphenol in the reaction to produce the bisphenols using a benzophenone as the photosensitizer, the phenol may react with both the fuchsone to produce the bisphenol and with the benzophenone to produce a fuchsone which would then react with the phenol to produce a bisphenol. If the fuchsone produced is the same as used as the initial reaction, then the two bisphenols will be identical, but, if not, a mixture of two bisphenols will be produced. If one does not desire this latter reaction, then either a benzophenone which will produce the same fuchsone as the starting material should be used or an acetophenone should be used as the photosensitizer since it does not react with the phenol to produce the bisphenol. If the acetophenone is a liquid, it acts as a solvent as well, especially for the bisphenol product, thus preventing the precipitation of the latter when used in sufficiently high amounts. If precipitation of the bisphenol product is desired, a benzophenone or acetophenone should be used which is a solid at the temperature used, but which is soluble in the solvent used.

In order that those skilled in the art may better understand my invention, the following examples are given by way of illustration, but not by way of limitation. In all of the examples, all parts and percentages are by weight unless stated otherwise. In the elemental analyses of the products, the values given are in percent. The theoretical values for the analyses and molecular weights are given in parentheses following the determined values.

GENERAL PROCEDURE

The general procedure, utilized in the following examples, is to prepare a solution of the particular phenol and fuchsone (Examples 1–15) or the particular phenol and the benzophenone (Examples 16–23) in methanol, the preferred solvent, purge the solution with nitrogen, then irradiate the solution cooled to 18° C. until the solution becomes colorless or is only slightly yellow. Although the fuchsone, generally, does not completely dissolve in the solution, sufficient of the fuchsone is dissolved to enter into the reaction and by the time the reaction is stopped, all of the fuchsone has gone into solution. If the bisphenol has precipitated, the reaction mixture is concentrated and the precipitate of the bisphenol is removed by filtration, otherwise the bisphenol is isolated by distilling off the other materials under reduced pressure, leaving the bisphenol as the residue. In general, the bisphenol products were recrystallized by dissolving in a hot solvent, usually chloroform, acetone or ether, and adding a non-solvent, usually methanol.

The light source used was a 100 watt mercury vapor lamp, General Electric type, H–100 A 4/T, from which the glass jacket had been removed, leaving only the quartz envelope. This was surrounded by a Pyrex glass tube assembled to allow water cooling. The lamp and Pyrex glass jacket were surrounded by a vessel to contain the reaction mixture.

Using the general procedure, the following examples give the specific details of the preparation of bisphenols illustrative of my invention.

EXAMPLE 1

A solution containing 2.06 g. of 2,6-di-t-butylphenol, 12 g. of acetophenone and 0.2 ml. of concentrated hydrochloric acid in 60 ml. of methanol in which 1.85 g. of 3,5-di-t-butylfuchsone was partially dissolved was irradiated for 18 hours. Distillation of the reaction mixture at 100° C. at 1 mm. pressure, left the bisphenol product as a residue which, after recrystallization from chloroform and methanol yielded 2.71 g. of 4,4'-dihydroxy-3,3',5,5'-tetra-t-butyltetraphenylmethane having a melting point of 235° C. This material showed no depression in melting point when mixed with the identical bisphenol made in Example 16.

EXAMPLE 2

A suspension of 1.055 g. of 3,5-dicyclohexylfuchsone in a solution of 1.03 g. of 2,6-di-t-butylphenol, 15 g. of acetophenone and 0.1 ml. of concentrated aqueous hydrochloric acid in 50 ml. of methanol was irradiated for 5 hours at which point the clear solution suddenly turned almost colorless. After distillation at 90° C. under 1 mm. of pressure, the residual light yellow crystalline solid residue was recrystallized from acetone and methanol. Addition of few drops of water to the solution caused rapid crystallization. A yield of 1.3 g. of 3,5-dicyclohexyl-4,4'-dihydroxy-3',5'-di-t-butyltetraphenylmethane was obtained having a melting point of 199–201° C.

EXAMPLE 3

A solution containing 1.713 g. of 3,5-diisopropylfuchsone, 2.06 g. of 2,6-di-t-butylphenol, 12.0 g. of acetophenone and 0.2 ml. of concentrated aqueous hydrochloric acid in 60 ml. of methanol was irradiated for 18 hours. Vapor phase chromatographic analysis of the reaction mixture showed only a trace of the residual fuchsone. Distillation at 100° C. at 1 mm. pressure left a solid residue which was triturated with a few ml. of methanol and filtered. After recrystallization from methanol and water, a yield of 2.0 g. of 4,4'-dihydroxy-3,5-diisopropyl-3',5'-di-t-butyltetraphenylmethane was obtained having a melting point of 196–198° C.

EXAMPLE 4

A solution containing 1.92 g. of 3-methyl-5-phenylfuchsone, 2.06 g. of 2,6-di-t-butylphenol, 15 g. of acetophenone and 0.1 ml. of concentrated aqueous hydrochloric acid in 50 ml. of methanol was irradiated for 11.5 hours. At that time, the yellow solution suddenly appeared almost completely colorless. The methanol, acetophenone and excess of 2,6-di-t-butylphenol was removed by distillation at 1 mm. pressure at 100° C., leaving an almost colorless crystalline residue which was recrystallized from ether and methanol. There was obtained a yield of 2.75 g. of 3,5 - di-t-butyl-4,4'-dihydroxy-3'-methyl-5'-phenyltetraphenylmethane having a melting point of 186–187° C.

EXAMPLE 5

A suspension of 2.05 g. of 3,5-diphenylfuchsone in a solution of 2.06 g. of 2,6-di-t-butylphenol, 15 g. of acetophenone and 0.1 ml. of concentrated aqueous hydrochloric acid in 50 ml. of methanol was irradiated for 4 hours at which time the yellow reaction mixture suddenly turned colorless. Vacuum distillation at 80–100° C. at 1 mm. pressure left a residue of a colorless crystalline material which was recrystallized by dissolving in warm ether and adding methanol. There was obtained a yield of 2.72 g. of 4,4'-dihydroxy-3,5-diphenyl-3',5'-di-t-butyltetraphenylmethane having a melting point of 195–196° C.

EXAMPLE 6

A suspension of 1.95 g. of 3-t-butyl-5-phenylfuchsone in a solution of 2.06 g. of 2,6-di-t-butylphenol, 15 g. of acetophenone and 0.1 ml. of concentrated aqueous hydrochloric acid in 50 ml. of methanol was irradiated for 15.5 hours, at which time the yellow solution suddenly appeared almost completely colorless. Vacuum distillation at 100° C. at 1 ml. pressure left the product as a light yellow crystalline residue which was washed with methanol and recrystallized by dissolving it in a little warm ether and adding methanol. There was obtained a yield of 2.70 g. of 4,4'-dihydroxy-3-phenyl-3',5,5'-tri-t-butyltetraphenylmethane having a melting point of 188–189° C.

The same material was prepared also by using a suspension of 1.85 g. of 3,5-di-t-butylfuchsone in a solution of 2.26 g. of 2-t-butyl-6-phenylphenol, 18 g. of actetophenone and 0.1 ml. of aqueous hydrochloric acid in 60 ml. of methanol which was irradiated for 48 hours. After distillation at 1 mm. of pressure at 185° C. the glassy brown residue was treated with 100 ml. of warm methanol. The light yellow crystalline substance obtained was removed by filtration of the warm solution. There was obtained a yield of 1.65 g. of 4,4'-dihydroxy-3-phenyl-3',5,5'-tri-t-butyltetraphenylmethane having a melting point of 188–189° C. which showed no depression in melting point when mixed with the same material prepared in the first part of this example.

EXAMPLE 7

A solution of 2.06 g. of 2,6-di-t-butylphenol, 18 g. of acetophenone and 0.1 ml. of concentrated hydrochloric acid in 50 ml. of methanol containing 1.78 g. of 3,5-diisopropyl-4'-methylfuchsone was irradiated for 14 hours, by which time the yellow solution was almost colorless. After distillation at 1 mm. pressure at 100° C., the yellow solid residue was recrystallized from a mixture of acetone, methanol, and a little water, yielding 2.25 g. of 4,4'-dihydroxy - 3,5 - diisopropyl-3',5'-di-t-butyl-4''-methyltetraphenylmethane having a melting point of 185–188° C.

EXAMPLE 8

A suspension of 1.09 g. of 3,5-dicyclohexyl-4'-methylfuchsone in a solution of 1.03 g. of 2,6-di-t-butylphenol, 15 g. of acetophenone and 0.1 ml. of concentrated aqueous hydrochloric acid in 50 ml. of methanol was irradiated for 5 hours, by which time the clear solution suddenly turned almost colorless. After vacuum distillation at 1 mm. pressure at 90° C., there was obtained a colorless crystalline residue which was recrystallized by dissolving in hot acetone and adding methanol yielding 1.34 g. of 3,5-dicyclohexyl - 4,4' - dihydroxy -3',5' - di - t-butyl-4''-methyltetraphenylmethane having a melting point of 210–212° C.

EXAMPLE 9

A suspension of 1.025 g. of 3,5-diphenylfuchsone in a solution of 1.23 g. of 2,6-diphenylphenol, 15 g. of acetophenone and 0.03 ml. of concentrated aqueous hydrochloric acid in 50 ml. of methanol was irradiated for 22 hours. After vacuum distillation at 140–150° C. at 1 mm. of pressure, there was obtained a yellow oily residue which upon treatment with boiling methanol gave pale yellow crystals. After recrystallization by dissolving in hot ether and adding methanol there was obtained a yield of 1.0 g. of 4,4'-dihydroxy-3,3',5,5'-tetraphenyltetraphenylmethane having a melting point of 233–234° C.

This same compound was obtained by using a suspension of 2.05 g. of 3,5-diphenylfuchsone in a solution of 1.84 g. of 2,6-diphenylphenol, 9.1 g. benzophenone and 0.1 ml. of aqueous hydrochloric acid in 50 ml. of methanol which was irradiated for 9 hours. After vacuum distillation at 145° C. and 1 mm. of pressure, there again was obtained a light yellow oily residue which crystallized upon treatment with methanol yielding 1.25 g. of 4,4'-dihydroxy-3,3',5,5'-tetraphenyltetraphenylmethane having a melting point of 231–232° C. which showed no depression in the melting point and mixed with the same material prepared above.

EXAMPLE 10

A suspension of 1.055 g. of 3,5-dicyclohexylfuchsone in a solution of 1.29 g. of 2,6-dicyclohexylphenol, 15 g. of acetophenone and 0.1 ml. of concentrated aqueous hydrochloric acid in 50 ml. of methanol was irradiated for 13 hours. After vacuum distillation at 130° C. under 1 mm. of pressure, there was obtained a light yellow solid residue which yielded colorless crystals upon treatment with methanol. There was obtained a yield of 1.15 g. of 4,4'-dihydroxy - 3,3',5,5' - tetracyclohexyltetraphenylmethane having a melting point of 252–254° C. Recrystalization from a boiling ether-methanol mixture did not raise the melting point.

EXAMPLE 11

A solution containing 1.029 g. of 3,5-diisopropylfuchsone, 1.05 g. of 2,6-diisopropylphenol, 9.1 g. of benzophenone and 0.04 ml. of concentrated aqueous hydrochloric acid in 50 ml. of methanol was irradiated for 3 hours, by which time the solution had become colorless. After vacuum distillation at 145° C. at 1 mm. pressure, there was obtained a light yellow residue which, after recrystallization from aqueous methanol yielded 1.15 g. of 4,4'-dihydroxy-3,3',5,5' - tetraisopropyltetraphenylmethane having a melting point of 192–193° C.

EXAMPLE 12

A solution containing 1.95 g. of 3-t-butyl-5-phenylfuchsone, 2.26 g., 2-t-butyl-6-phenylphenol, 18 g. of acetophenone and 0.1 ml. of concentrated aqueous hydrochloric acid in 50 ml. of methanol was irradiated for 26 hours. After vacuum distillation at 135° C. at 1 mm. pressure, there was obtained a light yellow crystalline residue which was triturated with methanol and recrystallized by dissolving in warm ether and adding methanol. There was obtained a yield of 2.75 g. of 4,4'-dihydroxy-3,3'-diphenyl-5,5'-di-t-butyltetraphenylmethane having a melting point of 181–182° C.

EXAMPLE 13

A suspension of 1.025 g. of 3,5-diphenylfuchsone in a solution of 1.13 g. of 2-t-butyl-6-phenylphenol, 15 g. of acetophenone and 0.1 ml. of aqueous hydrochloric acid in in 50 ml. of methanol was irradiated for 2 hours, by which time the solution was almost completely colorles. After vacuum distillation at 185° C. at 1 mm. pressure, there was left a light yellow glassy residue which yielded colorless crystals upon treatment with methanol, which were recrystallized by dissolving in ether and adding methanol. Repeating this procedure, the combined yield was 2.8 g. of 4,4' - dihydroxy-3-t-butyl - 3',5,5' - triphenyltetraphenylmethane having a melting point of 205–206° C.

EXAMPLE 14

A suspension of 0.58 g. of 3,5-di-t-butyl-4'-hydroxyfuchsone in a solution of 0.412 g. of 2,6-di-t-butylphenol, 12 g. of acetophenone and 0.2 ml. of concentrated aqueous hydrochloric acid in 50 ml. of methanol was irradiated for 27 hours. Vacuum distillation at 1 mm. pressure gave a solid residue that was recrystallized from aqueous methanol. The recrystallized material was subjected to vacuum sublimation at 10 mm. pressure and a bath-temperature of 140° C. in order to remove a volatile impurity. Recrystalization of the residue from hot methanol gave 0.35 g. of 3,3',5,5'-tetra-t-butyl-4,4',4'' - trihydroxytetraphenylmethane having a melting point of 259–260° C.

EXAMPLE 15

A solution containing 0.646 g. of 3,5-di-t-butyl-4',4''-dimethoxyfuchsone in a solution of 0.618 g. of 2,6-di-t-butylphenol, 15 g. of acetophenone and 0.1 ml. of concentrated aqueous hydrochloric acid in 50 ml. of methanol was irradiated 25 hours. After removal of volatiles by vacuum distillation and recrystallization of the residue there was obtained 0.315 g. of 3,3',5,5'-tetra-t-butyl-4,4'-dihydroxy-4'',4'''-dimethoxytetraphenylmethane having a melting point of 208–209° C.

The above examples have illustrated the preparation of the bisphenols by the reaction of a fuchsone and a phenol. The following examples illustrate the preparation of bisphenols from the phenol and the benzophenone without isolation of the fuchsone.

EXAMPLE 16

A solution of 4.12 g. of 2,6-di-t-butylphenol and 1.0 g. of benzophenone in 55 ml. of methanol containing 0.1 ml. of concentrated aqueous hydrochloric acid was irradiated for 24 hours. During the course of the reaction, additional benzophenone was added as follows: 1.0 g. after 1, 2, and 5 hours, 1.46 g. after 6 hours, and 0.91 g. after 21 hours (total 6.37 g.). Precipitation of the colorless crystals of the bisphenol began after 45 minutes of irradiation. The light yellow reaction mixture was diluted with 100 ml. of methanol and boiled for 3 minutes in order to dissolve co-precipitated benzopinacol. Filtration of the reaction mixture yielded 2.75 g. 4,4'-dihydroxy-3,3',5,5'-tetra-t-butyltetraphenylmethane having a melting point of 235° C. After standing an additional 24 hours, the filtrate yielded 0.17 g. of additional product.

When the reaction was repeated, but all of the benzophenone added at the start there was a very slight reduction in yield which may have been due to the small difference one would normally obtain when repeating a procedure.

EXAMPLE 17

A solution of 2.06 g. of 2,6-di-t-butylphenol and 3.92 g. of 4-methylbenzophenone in 75 ml. of methanol containing 0.2 ml. of concentrated aqueous hydrochloric acid was irradiated for 14 hours. The precipitate which had formed was removed by filtration after part of the solvent had been evaporated at room temperature. After recrystallization from warm chloroform by addition of methanol, there was obtained 1.1 g. of 3,3',5,5'-tetra-t-butyl-4,4' - dihydroxy - 4" - methyltetraphenylmethane having a melting point of 211–212° C.

EXAMPLE 18

A solution of 1.03 g. of 2,6-di-t-butylphenol and 1.63 g. of 4,4'-dimethylbenzophenone in 55 ml. of methanol containing 0.2 ml. of concentrated aqueous hydrochloric acid was irradiated for 4 hours, by which time a precipitate had formed. An additional 0.47 g. of 4,4'-dimethylbenzophenone was added. After 18 hours of irradiation, the reaction mixture was concentrated and filtered. Recrystallization of the colorless crystalline residue from chloroform and methanol yielded 0.475 g. of 3,3',5,5'-tetra-t-butyl - 4,4' - dihydroxy - 4",4'" - dimethyltetraphenylmethane having a melting point of 243–244° C.

EXAMPLE 19

A solution of 2.17 g. of 4-chlorobenzophenone and 2.06 g. of 2,6-di-t-butylphenol in 60 ml. of methanol containing 0.1 ml. of concentrated aqueous hydrochloric acid was irradiated for 23 hours. Filtration of the reaction mixture gave a crystalline precipitate which after recrystallization from boiling benzene and methanol yielded 1.75 g. of 3,3',5,5' - tetra - t - butyl - 4,4' - dihydroxy - 4" - chlorotetraphenylmethane having a melting point of 214–215° C.

EXAMPLE 20

A solution of 3.09 g. of 2,6 - di-t-butylphenol and 2.51 g. of 4,4'-dichlorobenzophenone in 80 ml. of methanol containing 0.2 ml. of concentrated aqueous hydrochloric acid was irradiated for 18 hours. After irradiation, the reaction mixture was boiled for a few minutes and filtered hot. After recrystallization of the precipitate from chloroform and methanol, there was obtained 1.7 g. of 3,3',5,5'-tetra - t - butyl - 4,4' - dihydroxy - 4",4'" - dichlorotetraphenylmethane having a melting point of 244–245° C.

EXAMPLE 21

A solution of 2.61 g. of 4-bromobenzophenone and 2.06 g. of 2,6-di-t-butylphenol in 60 ml. of methanol containing 0.1 ml. of concentrated aqueous hydrochloric acid was irradiated for 22 hours. After recrystallization of the precipitate which formed during the irradiation by dissolving in acetone and adding methanol, there was obtained 1.8 g. of 3,3',5,5' - tetra - t - butyl - 4,4' - dihydroxy-4"-bromotetraphenylmethane having a melting point of 214–215° C.

EXAMPLE 22

A solution of 1.4 g. of 4,4'-diacetoxybenzophenone and 1.55 g. of 2,6-di-t-butylphenol in 60 ml. of acetic acid containing 0.03 ml. of concentrated hydrochloric acid was irradiated for 28 hours. The colorless precipitate was removed from the reaction mixture by filtration yielding 1.4 g. of 3,3',5,5' - tetra-t-butyl - 4,4' - dihydroxy - 4",4'"-diacetoxytetraphenylmethane which had an unsharp melting point of about 200° C. In order to identify this product still further, it was hydrolyzed by dissolving it in a boiling mixture of 30 ml. of methanol and 3 ml. of concentrated aqueous hydrochloric acid and boiling for 10 minutes. Dilution with water gave a colorless precipitate which after recrystallization from a boiling mixture of chloroform and petroleum ether (B.P. 60–110° C.) yielded 0.61 g. of 3,3',5,5' - tetra - t - butyl - 4,4',4",4'" - tetrahydroxytetraphenylmethane having a melting point of 288–289° C.

EXAMPLE 23

A suspension of 2.4 g. of 4 - methoxycarbonylbenzophenone in a solution of 2.06 g. of 2,6-di-t-butylphenol in 60 ml. of methanol, acidified with 0.1 ml. of aqueous concentrated hydrochloric acid, was irradiated for 16 hours. After the usual work-up procedure, there was obtained a yield of 1.82 g. of 3,3',5,5'-tetra-t-butyl - 4,4' - dihydroxy-4" - methoxycarbonyltetraphenylmethane having a melting point of 220–221° C.

Table I gives the analytical data and molecular weights of the various bisphenols prepared above, except Example 1 where the compound was identified by having no depression in melting point when mixed with the identical bisphenol prepared in Example 16.

TABLE I

| Example: | C | H | M.W. |
| --- | --- | --- | --- |
| 2 | 85.83 (85.94) | 8.95 (8.97) | 615 (628.95) |
| 3 | 85.16 (85.35) | 8.72 (8.62) | 508 (548.82) |
| 4 | 86.83 (86.60) | 7.73 (7.63) | 540 (554.78) |
| 5 | 87.64 (87.63) | 7.23 (7.19) | 601 (616.86) |
| 6 | 86.48 (86.53) | 8.19 (8.11) | 566 (596.86) |
| 7 | 85.04 (85.36) | 8.89 (8.95) | 559 (562.85) |
| 8 | 85.71 (85.93) | 9.21 (9.09) | 625 (642.98) |
| 9 | 89.35 (89.60) | 5.36 (5.52) | 630 (656.84) |
| 10 | 86.51 (86.42) | 8.86 (8.88) | 637 (681.03) |
| 11 | 85.44 (85.34) | 8.30 (8.52) | 501 (520.77) |
| 12 | 87.79 (87.63) | 7.35 (7.19) | 582 (616.86) |
| 13 | 88.59 (88.64) | 6.32 (6.33) | 630 (636.85) |
| 14 | 82.87 (83.06) | 8.64 (8.84) | 588 (592.87) |
| 15 | 81.19 (81.09) | 8.78 (8.86) | 614 (636.93) |
| 16 | 85.25 (85.37) | 9.10 (9.09) | 563 (576.87) |
| 17 | 85.45 (85.37) | 9.25 (9.21) | 562 (590.90) |
| 18 | 85.55 (85.38) | 9.56 (9.33) | 582 (604.93) |
| 19 | 80.56 (80.56) | 8.41 (8.41) | 618 (611.32) |
| 20 | 76.17 (76.26) | 7.91 (7.80) | 596 (645.76) |
| 21 | 75.15 (75.10) | 7.86 (7.84) | 639 (655.78) |
| 22 | 80.98 (80.88) | 8.44 (8.61) | 647 (608.87) |
| 23 | 81.05 (81.35) | 9.04 (8.57) | 600 (634.84) |

The bisphenols of this invention have a wide variety of uses as intermediates for preparing other compounds or for use, per se, as anti-oxidants, or polymerization stabilizers for ethylenic unsaturated compounds to prevent polymerization. As anti-oxidants, they are useful in preventing oxidation of gasoline, fuel oils and lubricating oils, rubber compounds, etc.

Those bisphenols of this invention, in which the hydroxyl group is between two tertiary alkyl groups are hindered phenols with the hydroxyl group being protected from entering into reactions, such as, esterification. However those bisphenols of this invention in which one or more of the hydroxyl groups are not between two tertiary alkyl groups are capable of being esterified. Those bisphenols of this invention which have one such hydroxyl group are useful as chain terminating agents in the preparation of polyester resins. Those bisphenols, having two hydroxyl groups which are not between two tertiary alkyl groups, are useful as a dihydric phenol in the preparation of polyesters resins, including polycarbonate resins, by reacting with diacyl halides, for example, m- or p-phthaloyl halides, phosgene, chlorocarbonic esters, etc. Other uses for these bisphenols will be readily recognized by those skilled in the art.

Obviously, other modifications and variations of the present invention are possible in light of the above teachings. Therefore, it is to be understood that changes may be made in the particular embodiments of the invention described, which are within the full intended scope of the invention as defined by the appended claims.

What I claim as new and desire to secure by Letters Patent of the United States is:

1. The process of producing phenols having the formula:

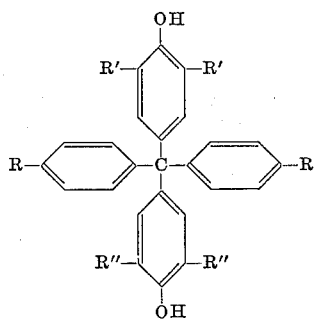

which comprises irradiating, in the substantial absence of oxygen and applied heat, with light having a wavelength in the range of 300–500 m$\mu$, but not substantially below 300 m$\mu$, a solution, acidified with a mineral acid, of (a) a phenol having the formula:

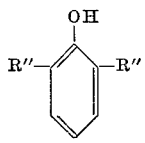

(b) a fuchsone having the formula:

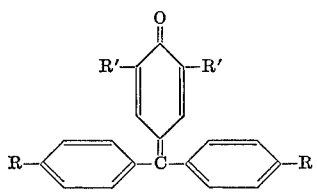

and (c) a photosensitizer selected from the group consisting of benzophenones having the formula:

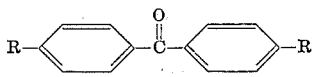

and acetophenones having the formula:

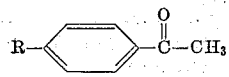

in an inert liquid solvent which is substantially transparent to the wavelength of light used, where in the above formulae, each R is independently selected from the group consisting of hydrogen, hydroxyl, halogen, alkyl, aryl, alkoxycarbonyl, acyloxy and hydrocarbonoxy, each R' is independently selected from the group consisting of aryl and alkyl and each R'' is independently selected from the group consisting of aryl and secondary and tertiary alkyl.

2. The process of claim 1 wherein the inert liquid solvent is methanol.

3. The process of claim 1 wherein each R' and each R'' is a tertiary alkyl group.

4. The process of claim 3 wherein the inert liquid solvent is methanol.

5. The process of claim 3 wherein the tertiary-alkyl group is tertiary-butyl.

6. The process of claim 5 wherein the inert liquid solvent is methanol.

7. The process of claim 1 wherein the R' substituents of the fuchsone and the R'' substituents of the phenol are so chosen that the two benzene rings containing the R' and R'' substituents are identically substituted in the bisphenol product.

8. The process of claim 1 wherein the R' substituents of the fuchsone and the R'' substituents of the phenol are so chosen that the two benzene rings containing the R' and R'' substituents are not identically substituted in the bisphenol product.

References Cited

UNITED STATES PATENTS 2,936,272   5/1960   Bender et al. _____ 204—158

OTHER REFERENCES

Masson et al.: Technique of Organic Chemistry (1956), vol. II, pp. 315 and 316.

HOWARD S. WILLIAMS, Primary Examiner